United States Patent
Schmidt et al.

(10) Patent No.: US 12,473,976 B2
(45) Date of Patent: Nov. 18, 2025

(54) VARIABLE-SPEED TRANSMISSION WITH ELECTRIC MOTOR-DRIVEN SHIFT DRUM, AND METHOD FOR CONTROLLING SUCH A VARIABLE-SPEED TRANSMISSION

(71) Applicant: MEGA-Line RACING ELECTRONIC GmbH, Saal an der Donau (DE)

(72) Inventors: Christian Schmidt, Hemau (DE); Norbert Fuchs, Pentling (DE)

(73) Assignee: Mega-Line Racing Technology GMBH, Langquaid (DE)

( * ) Notice: Subject to any disclaimer, the term of this patent is extended or adjusted under 35 U.S.C. 154(b) by 0 days.

(21) Appl. No.: 18/278,115

(22) PCT Filed: Feb. 3, 2022

(86) PCT No.: PCT/EP2022/052592
§ 371 (c)(1),
(2) Date: Aug. 21, 2023

(87) PCT Pub. No.: WO2022/175100
PCT Pub. Date: Aug. 25, 2022

(65) Prior Publication Data
US 2024/0125384 A1    Apr. 18, 2024

(30) Foreign Application Priority Data
Feb. 22, 2021    (DE) .................... 10 2021 104 101.5

(51) Int. Cl.
*F16H 61/04*    (2006.01)
*F16H 61/32*    (2006.01)
(52) U.S. Cl.
CPC ......... *F16H 61/0403* (2013.01); *F16H 61/32* (2013.01); *F16H 2061/0422* (2013.01);
(Continued)

(58) Field of Classification Search
CPC ................. F16H 61/0403; F16H 61/32; F16H 2061/0474; F16H 2200/0034; F16H 61/04; F16H 63/18
See application file for complete search history.

(56) References Cited

U.S. PATENT DOCUMENTS 6,725,737 B2    4/2004    Baasch et al.
7,963,183 B2    6/2011    Pick et al.
(Continued)

FOREIGN PATENT DOCUMENTS

WO    2004065825 A1    8/2004
WO    WO-2008029041 A1 *    3/2008    ......... F16H 61/2807

OTHER PUBLICATIONS

Translation of WO 2008/029041, Published Mar. 13, 2008, 15 Pages (Year: 2008).*
(Continued)

*Primary Examiner* — William C Joyce
(74) *Attorney, Agent, or Firm* — Simmons Perrine PLC

(57) ABSTRACT

Disclosed is a torque-converting or speed-converting variable-speed transmission with at least two gear ratios. Each gear ratios is assigned at least one changeable gear pair. Shifting elements act on sliding sleeves (24) connected to the gear pairs to change these gear pairs. The shifting elements are in engagement with a shift drum (10), which is moveable into defined angular positions and rotatable between these angular positions. The shift drum (10) has an electric-motor direct drive (12), which can rotate it and bring it into the particular defined angular positions. A method used to control such a torque-converting or speed-converting variable-speed transmission is also contemplated.

17 Claims, 5 Drawing Sheets

(52) U.S. Cl.
CPC ............... *F16H 2061/0474* (2013.01); *F16H 2200/0034* (2013.01)

(56) References Cited

U.S. PATENT DOCUMENTS

| | | | | |
|---|---|---|---|---|
| 8,798,883 | B2 * | 8/2014 | Oohata | .................. F16H 61/68 701/65 |
| 8,800,400 | B2 | 8/2014 | Takahashi et al. | |

OTHER PUBLICATIONS

PCT Application: PCT/EP2022/052592 filed Feb. 22, 2021—English Translation of International Preliminary Report on Patentability and Written Opinion dated Aug. 31, 2023.
PCT Application: PCT/EP2022/052592 Filed Feb. 3, 2022—International Search Report dated Apr. 5, 2022.

* cited by examiner

VARIABLE-SPEED TRANSMISSION WITH ELECTRIC MOTOR-DRIVEN SHIFT DRUM, AND METHOD FOR CONTROLLING SUCH A VARIABLE-SPEED TRANSMISSION

CLAIM OF PRIORITY

The present application claims priority to International Application PCT/EP2022/052592 filed Feb. 3, 2022, which in turn claims priority to German Application DE 10 2021 104 101.5 filed Feb. 22, 2021, which are incorporated by reference.

FIELD OF THE INVENTION

The present invention relates to a method used to control a torque-converting and/or speed-converting variable-speed transmission. The invention moreover relates to such a torque-converting and/or speed-converting variable-speed transmission.

BACKGROUND OF THE INVENTION

In conventional vehicle drives, the drive power of an internal combustion engine is transmitted mechanically to at least one driven axle of the vehicle. Since the typical speed ranges for internal combustion engines to be operated economically and with sufficient torque and power do not match the rotational speeds required at the axle drive, intermediate gear units are necessary that act both as torque converters and speed converters.

Such gear units can be designed as manually shiftable variable-speed transmissions in which gear ratio changes are carried out with simultaneous disconnection of a frictional connection, which can usually be performed with a friction clutch operated by a vehicle driver as required. Besides so-called automatic transmissions, which can be designed as planetary gearboxes, for example, there are numerous other types of gearboxes in which the gear ratio changes are performed by manual input.

Torque-converting or speed-converting variable-speed transmissions can also be used for electric vehicle drives, since the electric drive motors used as traction drives normally do not cover the entire speed range in an equally useful expedient manner. According to the drive concept, it is usually not possible to combine a high starting torque with a high final speed, so it can be useful to be able to carry out an adjustment by a variable-speed transmission located in the drivetrain.

Manually shiftable variable-speed transmissions often have gear sets, the particular engagement of which can be controlled by sliding sleeves that can be slid along shafts mounted in the gearbox housing in order to be able to bring different gear pairs into meshing engagement in such a way. The sliding sleeves, which are mounted on the shafts where they are slidable, are frequently actuated by rotatable shift drums, which interact via control cams with shift forks or shift pins, which in turn engage in or interact with the sliding sleeves. A rotation of the shift drum by a defined rotation angle, which can also be less than 90°, for example, causes a displacement or angle adjustment of the shift forks or shift pins that are coupled with the sliding sleeves, which in turn causes an activation or deactivation of one of the gear pairs and thereby the engagement or disengagement of a gear ratio of the variable-speed transmission.

A particularly compact construction of such manually actuable variable-speed transmissions is formed by a so-called sequentially operating transmission, in which the use of suitable sensors and suitable actuators also enables partially or fully automatic shift and gear ratio change operations.

DE 10 2010 013 962 A1 describes a sequential gearshift system with a control for a motor-driven gear shift drum. The transmission comprises at least two selectively coupleable gearsets and a rotatable shift drum to select the gearsets to be coupled in, whereby an input shaft of the transmission is friction- and torque-connected to an output shaft of the transmission. The shift drum is driven by a control motor. A torque sensor senses the drive torque applied to the shift drum by the control motor. The control motor is actuated based on the torque values sensed by the torque sensor. This is the way in which the coupling of the gearset is controlled.

From WO 2004/65825 A1, a control system is moreover known that comprises an actuator for changing the position of a shift drum of a gear change transmission. In this context, a position controller controls the position of the shift drum in a change from an original gear to a target gear.

EP 1 199 500 B1 moreover describes an electromotively driven shift drum of a variable-speed transmission where the electric motor driving the shift drum has a stator without a housing and a rotor, which stator and rotor are situated for the purpose of a compact construction between the shift drum and an axle on which the shift drum is mounted.

Known sequential shifting transmissions can be designed as so-called dog boxes, which are characterized, among others, by their very fast shiftablity without the use of the synchronization as known from customary variable-speed transmissions. Such so-called dog boxes, also known as dog ring transmissions, can in principle also operate according to a known H shift pattern. The shift sleeves used in such dog ring transmissions or dog boxes do not have the usual larger number of small engagement teeth for axial engagement with the cogwheels to be shifted, but mostly only few large teeth, which are moreover slightly undercut. The same number of teeth are on the front faces of the cogwheels that are bringable into engagement with the sliding sleeves. The shift sleeves and cogwheels can have four or six large teeth, for example, and the ratio between tooth and space can be approximately 30:70 over the front-face engagement ring of the shift sleeves and cogwheels, which is in particular intended to reduce the risk of the teeth impacting with each other in the shift operation.

Since the conventional synchro rings of bronze material are dispensed with, an abrupt synchronization takes place in such types of gearboxes when the teeth engage with each other. The teeth are shaped to be conical, but flat, and they are laterally relief-ground or undercut, which can cause a contraction of the cogwheel and the shift sleeve under load, and which can also prevent the gears from popping out after the connection has been established. This very harsh synchronization, however, also leads to a relatively high wear on the edges of the teeth on the shift sleeves. In order to prevent additional stress on the teeth and their edges, the shift operations have to be performed quickly, usually significantly quicker than in conventionally synchronized transmissions, although the shift operations can optionally be performed without the aid of the coupling if the load in the drivetrain is sufficiently reduced at the right time.

By a shift drum, a dog box transmission can be designed as a sequentially operating transmission. The term "sequentially operating transmission" refers to the sequence of the gear steps, however, not to the arrangement of the gears in the transmission. The shift drum responsible for sliding the sliding sleeves, which shift drum is coordinated with the particular transmission, has milled slots serving as guide plates for the shift forks to be pushed into position. The selection of the path and the engagement of the gear are largely simultaneous. The shift drum is adapted to each transmission. The advantage of such transmissions is the high shifting speed.

The primary object of the invention is to provide an improved method to control a variable-speed transmission with an electric-motor-driven shift drum, with the result that typically all occurring operating modes, which in particular include all change operations to select different gear ratios of the transmission, should be performable as material-friendly and reliably as possible.

In this connection, the further object of the invention is to provide a better controllable variable-speed transmission with electric-motor-driven shift drum, with which the typically occurring operating modes, which in particular include all change operations to select different gear ratios of the transmission, can be performed as material-friendly and reliably as possible.

These objects are solved by a method used to control a variable-speed transmission having the features of the independent claims. Further advantageous embodiments of the invention are described in the relevant dependent claims.

SUMMARY OF THE INVENTION

In order to solve the above-mentioned objects, the present invention proposes a method to control a torque-converting and/or speed-converting variable-speed transmission, which has an input shaft and an output shaft and at least two gear ratios. The variable-speed transmission that is controlled using the method according to the invention furthermore has at least two changeable gear pairs, the cogwheels of these at least two changeable gear pairs each being mounted on shafts and/or rotating on or with these shafts, which are mounted in a gearbox housing or mounted otherwise. Typically, these cogwheels pr gear pairs can be thereby activated or brought into engagement by claw rings being slid along the shafts in axial direction in order to be able to bring different gear pairs into a meshing engagement according to the desired gear ratio.

The variable-speed transmission furthermore comprises suitable shifting elements, in particular in the form of movable shift forks, shift pins, or the like, which act on sliding sleeves, which are connected to the gear pairs or to the cogwheels of the gear pairs and are able to change these gear pairs or cogwheels, which change causes, in particular, an axial sliding of the claw rings that are bringable into engagement with the cogwheels, in which context the claw rings cause those particular cogwheels or gear pairs to come into engagement that deliver the particular gear ratio to be selected.

In addition, the shifting elements are in engagement and/or in operative connection with a a shift drum which is bringable into defined angular positions and rotatable between these angular positions, with this shift drum having an electric-motor drive, in particular, an electric-motor direct drive, which can rotate the shift drum and bring it into the particular defined angular positions. The electric-motor direct drive of the shift drum can be preferably formed by a brushless DC motor or another suitable electric motor having the desired characteristics that are necessary or particularly desirable for the intended purpose of application.

Due to its specific purpose of application, such a drive motor belongs to the category of the so-called low-speed motors, which are also referred to as torque motors. Such torque motors have relatively high torques at a comparatively low rotational speed level. In this way it is possible for the shift drum drive designed with an electric motor to be configured in a particularly compact manner and with a high power density in such a variable-speed transmission.

An expedient embodiment variant of the variable-speed transmission controllable according to the invention can provide that the electric-motor direct drive coupled with the shift drum is a pluggable module and/or quickly exchangeable and/or exchangeable without tools.

The brushless motor allows a high power density and thus a particularly compact construction, so that any gearbox ratios between shift drum and motor can be dispensed with. In addition, such a compact motor with high power density offers various advantages regarding packaging, because there is a high degree of variability for the installation of the motor, optionally inside the gearbox housing, so that a shaft passage for the shift drum drive can be dispensed with.

Since such brushless motors are in addition very precisely controllable and can be used as stepper motors, it is possible to dispense with a sensor system for the detection of a current rotation angle of the shift drum. In addition, the variable-speed transmission according to the invention can be operated without a so-called gear position sensor, because such a sensor is either already present in the electrical drive motor for the shift drum, or it can be substituted due to its specific characteristics.

The electric-motor direct drive of the shift drum can be optionally formed by a so-called internal rotor motor for the variable-speed transmission. In this case, the rotor is inside, while the stator enclosing the rotor is arranged outside. A useful construction embodiment of such an internal rotor motor, which can be formed, in particular, by a torque motor, can be provided with fewer slots than poles, for example, which can reduce undesired latching effects. A variant with twelve slots and fourteen poles, for example, can fulfill this purpose of creating a very minor latching.

The electric-motor direct drive of the shift drum can optionally also be formed by a so-called external rotor motor. In this case, the stator is inside, while the rotor enclosing the stator is arranged outside. A useful construction embodiment of such an external rotor motor, which can be formed, in particular, by a torque motor, can be provided with fewer slots than poles, for example, which can reduce undesired latching effects. A variant with twelve slots and fourteen poles, for example, can fulfill this purpose of creating a very minor latching.

It can furthermore be advantageous to provide neutral gear positions between the gears for one embodiment variant of the variable-speed transmission, which can be realized, in particular, in that the electric-motor direct drive of the shift drum, in particular by its being actuable, provides or can provide neutral gear positions in each case between two adjacent shift stages.

In connection with the control method according to the invention for the above-described variable-speed transmission, which control method is explained below in numerous embodiment variants, it is particularly expedient to actuate the electric-motor direct drive of the shift drum electronically, which can be carried out via a bus system, such as a CAN bus or the like system. Besides precision controllability, such an actuation has the further advantage that the acuating electronics can influence or define the behavior of the electric motor.

It is thus possible, for example, to limit the drive torque of the motor or to specify the drive torque of the motor within desired limits by a current limit. By such a precision detection of a current current consumption of the drive motor for the shift drum, it is in addition possible to derive and detect the entire behavior of the components in operative engagement with and/or actuated by the shift drum. These components in operative engagement with and/or actuated by the shift drum are, for example, the shifting elements or shift forks, the sliding sleeves slid by the shifting elements or shift forks along the gear shafts, which sliding sleeves are in turn bringable into engagement with the particular adjacent cogwheels of the gear pairs by the action of the shifting elements or shift forks actuated by the shift drum, whereby a desired gear ratio of the transmission is selected.

As already mention above, the present invention proposes a method to control a torque-converting and/or speed-converting variable-speed transmission as already explained in various embodiment variants above and by which the above formulated object is to be solved. The variable-speed transmission controllable by the method according to the invention has an input shaft and an output shaft and at least two gear ratios, each of which is assigned at least one changeable gear pair. The transmission is furthermore characterized by shifting elements acting on sliding sleeves connected to and/or bringable into operative engagement with the gear pairs and being able to change these gear pairs. In addition, the shifting elements are in engagement with a shift drum, which is bringable into defined angular positions and rotatable between these angular positions, with this shift drum being coupled with an electric-motor direct drive, which can rotate the shift drum and bring it into the particular defined angular positions in order to change gear ratios.

In particular, a permanently excited synchronous motor can be used as the electric-motor direct drive for the shift drum, since such a motor type is particularly suitable for the purpose of application described here.

When activating or deactivating a gear ratio and/or when changing gear ratios of the variable-speed transmission, the moments of inertia each of the actuator, the shift drum, and the shift fork/shift forks to be moved are taken into consideration and included in the control cycle. For this purpose, the rotational energy and its partial time derivative are calculated taking into consideration the movement of the shift drum. This applies when undoing an engagement of the sliding sleeve with a cogwheel of the gear pair of a first gear ratio, for example, in which the at least one sliding sleeve is axially slid and disengaged from the cogwheel of the gear pair of the first gear ratio. This also applies when establishing an engagement of the sliding sleeve with a cogwheel of the gear pair of a second gear ratio, in which the sliding sleeve is also axially slid and brought into engagement with the cogwheel of the gear pair of the second gear ratio.

With the aid of the method according to the invention, very precise and reliably reproducible shift change operations can be carried out in a sequential transmission with an electromagnetic drive motor serving as actuator for the shift drum. The method according to the invention is moreover particularly suitable for carrying out the shift change operations with comparatively low mechanical loads and thus with low or reduced wear, since impact loads and pronounced pulse loads, in particular, can be reduced.

The term "shift change operations" used here refers to all the different upshift and downshift operations or to those upshift and downshift operations that can be carried out in practice with the particular transmission in different or successive gear ratios.

In order to enable a smooth shifting procedure to be able to prevent faulty procedures during the shift operations and a thereby impending or therewith associated damage to the mechanical system, at least the rotational energies of the rotating parts involved in the shift change operations are taken into consideration, besides other optional functionalities, which will be explained further below. The rotational energies of the rotating parts are determinable for each present transmission by the masses and the moments of inertia of the rotating parts being known, so that parts in meshing engagement and/or in non-rotational connection with each other as a total rotation body are also known in terms of their masses and their mass moments of inertia. In addition, all rotational speeds within the transmission can be permanently determined and/or derived, for example based on the influences by the shift drum, in particular by the electric-motor-actuated shift drum (so-called E-shift drum), by the shift forks, etc.

For carrying out the shifting procedures, it is expedient to use electronic shift programs for the shift drum that are able to take into consideration diverse constraints and conditions and/or to refer to different characteristic maps.

For all shift operations to be carried out in a sequential transmission, in particular, in a so-called dog ring transmission, it is necessary to reduce potential overshoots and/or undershoots of the actual position as far as possible during the setting of the target position and thus of the target gear, since these states entail the risk that the target gear, which in the present context is also often referred to as the second gear ratio, is disengaged again, which can involve damage to the mechanical system, in particular to the shift sleeve in question and/or to the dog ring in engagement therewith or in question. Furthermore, and depending on the error signal of the positions, premature braking of the gear pair of the target transmission is also not advisable, as this can likewise lead to damage during the engaging of the gear and can moreover result in a significant loss in shift performance.

As already explained above, the dog rings of sequential transmissions have a comparatively small number of teeth, which moreover have undercuts, so that a comparatively hard engagement takes place between the corresponding toothings of the shift sleeves and the adjacent front-face dog rings of the cogwheels of the various gear ratios, and it is also necessary for a successful shift operation for this hard engagement to take place.

Using sufficiently quickly operating control devices and regulating devices, the method according to the invention calculates at all times the rotational energy present both in the actuator, that is, in the shift drum and in its drive motor, and in the moved and rotating parts of the transmission, whereby an approximately ideal deceleration and an ideal braking point for each gear to be shifted can be determined via an algorithm, since the control program can precalculate or at least estimate the future position of the tooth flanks and engagement points of the dog rings based on the rotational energy present and/or to be expected in each case.

According to the construction type of the electric drive used for the shift drum drive, field-oriented control, also known as vector control, can be included in the control algorithm for a targeted control of the rotational energy and the torque provided by the electric drive. In this context, it is possible to achieve an improved and, ideally, an optimal power efficiency by a targeted superposition of the field-oriented control with the so-called space vector modulation. The method merely pointed out here serves to achieve optimum torque production or torque transmission as well as effective power factor correction.

Via various tables, factors can be adjusted to select and apply the braking algorithm for the particular application. As soon as the braking algorithm of the system according to the invention is activated, the braking algorithm calculates an additional vector which is added to the field vector of the actual standard controller. The system thus serves as an amplifier for the actual control cycle.

In the method according to the invention, the rotational energies of the rotating parts in engagement with the particular cogwheels involved in a change of a particular gear ratio can optionally be taken into consideration. As already explained above, this option is expedient because otherwise, cumulative rotational energies of several rotation bodies in engagement with each other would possibly not be taken into consideration.

In addition, the rotational energies for different gear ratios are each weighted differently and/or are taken from tables or characteristic maps and each taken into consideration differently. This makes it possible to adapt the parameters used separately for each gear change, since the moments of inertia between different gear pairs are generally different, and thus, the rotational energies are also different.

A useful variant of the method according to the invention can provide that the rotational energies of the shift drum and/or of the electric-motor direct drive driving the shift drum are additionally or separately taken into consideration.

In order to be able to carry out the method effectively, it will generally be necessary to electronically couple the electric-motor direct drive of the shift drum with a drive control of a drive motor, so that the torque requirements necessary for change operations can be carried out in a coordinated manner by the drive motor, in particular in connection with the necessary fast shift operations, which are also often carried out in a clutchless manner.

According to a further embodiment variant, the method can provide that a drive torque of the drive motor is reduced during and/or in preparation of a disengaging operation of a sliding sleeve from a cogwheel of a first gear ratio to be deactivated, the first gear ratio also being referred to as initial gear. This serves, in particular, to allow the sliding sleeve to be disengaged with reduced disengagement force, that is, the drive is preferably largely load-free during these periods.

During the disengaging operation, it can be useful to preload the shift fork, which is in operative engagement with the sliding sleeve, with a defined and/or variable preload force, that is, to continuously preload the shift fork more strongly with a defined slope, in which context the preload force is less than a shift force that is only exerted on the shift fork when the drivetrain is load-free. This allows the resilience resulting from the elasticity of the shift fork to be suppressed, which, ideally, can effectively prevent the sliding sleeve from bouncing back due to an elastically preloaded shift fork behaving like a spring.

After a valid shift request that has been checked by the control system for plausibility and feasibility, the first operation to be performed by the actuator is the disengaging of the initial gear. For this purpose, the control requests a so-called cut from the motor control of the drive motor coupled with the variable-speed transmission. With this function, the drivetrain is made largely torque-free by the drive motor reducing the driving torque or downshifting it completely to a value of zero. This step is necessary in order to perform a disconnecting of the dogs or the shift sleeves from the cogwheel and in order to disengage a gear without clutch actuation.

According to the quality of the motor control, of the drive motor, and of the set operating point, a period of time elapses before the motor can reduce the torque to the particular necessary extent and before the system is load-free. However, the shift operation is often already activated during this period of time, and the shift actuator attempts to disengage the gear that is still loaded with torque. This causes the shift fork of the gear pair to be preloaded, as the shift actuator also builds up a force in order to disengage the gear. If the drive gear then becomes torque-free, it is possible that the shift fork behaves like a spring component and springs back completely to the initial gear. This results in a loss of shift performance and can lead to mechanical damage.

The above-mentioned method variant prevents such behavior by increasing the torque, which is imparted by the shift actuator to the shift fork when the drivetrain is not yet torque-free, with a defined slope and holding it at a defined level so that the complete force of the actuator is not transmitted to the shift fork. Thereby, the resilience of the shift fork does not take effect, and the gear can be disengaged without bouncing back when the system is torque-free. After the gear has been successfully disengaged, this method mode is terminated and the system can change back to the normal shifting procedure.

The method can furthermore provide the disengaging operation to be performed after a shift request with a defined delay and in coordination with the behavior of the drive motor of which the drive torque has previously been reduced. Preferably, this makes it possible to achieve an improved coordination with the typical down-revving operation of the particular drive motor, since a too early activation only leads to an otherwise ineffective preloading of the shift fork, which would, however, lead to an undesired power consumption of the shift drive for the shift drum and to its unnecessarily heating up.

When a so-called down-revving operation is referred to in this context, this is intended to relate to rotational speed reductions that take place after a reduction in a power request or speed request. This drop in motor speed does not occur abruptly after a power request or speed request has been canceled, since numerous moments of inertia of the rotating parts provide for a gradual decline in motor speed. The lower the total of effective flywheel masses, the faster an engine can rev down when its speed request or power request has been canceled.

Essentially the same principles apply conversely, so that an increase in rotational speed can only take place with a certain delay due to the effective mass inertia forces. In order to reduce these inertias, it is common for motorsport use to make such relatively heavy rotating parts lighter—for example, a clutch flywheel connected to the engine crankshaft of an internal combustion engine—whereby it is possible to both reduce a down-revving time and significantly accelerate a sudden increase in rotational speed.

When a shift operation is started, the shift drum receives a corresponding request so that the shift drum acting as actuator can start the disengaging operation of the initial gear. Regardless of whether this is carried out with the above-explained gradual preloading of the shift fork or without such a preloading, it can happen in this context that the drivetrain is not yet load-free because, for example, the internal combustion engine or the electric motor used as vehicle drive still requires a defined period of time before the operating point for a torque-free behavior of the drivetrain can be set.

Depending on application and construction type of the particular internal combustion engine or electric motor used as the drive motor for a vehicle, this period of time may be several milliseconds, during which a disengaging operation is impossible and actuator input is unnecessarily high. In this case, the electric motor of the actuator, that is, the drive motor for the shift drum, uses a defined power consumption.

Since the effects of a shift operation that is non-performable due to excessive preload in the parts to be moved should be reduced or completely avoided, if possible, the present method optionally offers the possibility to specify for each defined shift operation a period of time for the actuator to wait after the shift request has been received before starting the disengaging operation. This option allows to significantly reduce the average power consumption and the therewith associated heating of the actuator.

According to another embodiment variant, the method can furthermore provide that, in preparation of or during an engaging operation, while the sliding sleeve previously disengaged from the cogwheel of the deactivated first gear ratio is approaching an adjacent cogwheel of a second gear ratio to be activated, a positive fit is found out for the sliding sleeve by detecting a torque curve and/or speed curve of the electric-motor direct drive of the shift drum and identifying therefrom whether the sliding sleeve has established the engagement with the cogwheel of the second gear ratio to be activated. When a dog ring or sliding sleeve is moved toward a cogwheel of a target gear, an attempt is made in this context for the dog ring or sliding sleeve to meet with the in each case appropriate "tooth space" in order for the dog rings to engage. By detecting the speed curve and the current consumption in the drive motor for the shift drum, it is at the same time possible to identify whether the dog "takes grip" and engages or "springs back", which is transmitted as a pulse via the shift fork and introduced into the shift drum.

In the course of each shift operation, there is generally a given probability of a so-called dog impacting with a dog of the target gear. The dogs of the target gear corresponding to the dogs of the shift sleeve are mounted on the gear ring of the target gear and are thus part of the rotating components of the transmission. Several dogs are fastened to a gear at an angular distance in order to shorten it. The distance between two dogs spanning a common angle is called dog window.

The dog located on the shift sleeve and being moved into the target gear with the shift fork is mechanically disconnected from the dog rings of the gears and must be transported into a dog window of the target gear in order for a gear to be engaged. If the dog of the shift sleeve impacts with a dog of the target gear during the engagement phase, a pulse is converted in this context which causes energy to be transmitted to the shift fork. According to the energy input, it is possible that the translational vector of the shift fork is inverted and the target gear is disengaged again toward the initial gear. This operation can also be regarded as a dog-to-dog event and will accordingly be referred to as such a dog-to-dog event in the present context.

These faulty engaging operations known as dog-to-dog events have proven to occur relatively frequently in shift operations of any kind. Since these events in each case lead to pronounced discontinuities in the control procedures, it is expedient to detect such dog-to-dog events in order to be able to initiate useful countermeasures.

For this purpose, the method according to the invention provides a specific algorithm, which acts in parallel as a sub-element of the actual shifting procedure and identifies such a dog-to-dog event on the basis of the rotational speed and direction of movement of the actuator or of the shifting element actuated by the shift drum or of the shift fork moved by the shift drum. If necessary, this identifying can be carried out indirectly by the analysis of the current consumption and the speed curve at the drive of the shift drum, since the specific characteristics of such dog-to-dog events are quite accurately determinable and are therefore also identifiable in the normal shifting procedure.

A further advantageous method option can provide that, after occurrence of a dog-to-dog event and thus an unsuccessful engaging operation and/or after an unsuccessful attempt to establish an engagement between sliding sleeve and cogwheel of the second gear ratio to be activated, the engaging operation is repeated at least once or preferably several times by corresponding reverse rotation and repeated rotation of the shift drum with correspondingly guided shift fork. In the control program, this method variant can also be characterized by a repetition of the procedures of the shift operation being initiated after identification of an inversion of the translational vector of the shift fork and therewith associated disengagement of the dog away from the target gear back toward the initial gear.

How often such faulty shift operations are expediently repeated depends on the particular programming and also on the shifting philosophy represented in the program. A certain number of permitted repetitions can be absolutely useful in this context in order to keep the gear shift functional under preferably all occurring external circumstances. However, a too large a number of permitted repetitions can potentially also lead to damage if, for example, other faulty phenomena are skipped or ignored.

The method can optionally also provide that an unsuccessful engaging operation and/or an unsuccessful attempt to establish an engagement between sliding sleeve and cogwheel of the second gear ratio to be activated leads to further analyzing operations. For example, a dog-to-dog event and an unsuccessful engaging operation can be detected and/or identified at least based on the detection of the rotational speeds of the cogwheel or cogwheels of the second gear ratio and/or based on the detection of the angular velocity and/or of the rotation angle of the shift shaft and/or of the drive torque of the electric-motor direct drive to be applied for the rotation of the shift shaft.

It is expedient to perform such a dog-to-dog identification based on the rotational speeds of the cogwheels, of the shift shaft, and of the drive torque for the rotation of the shift shaft in which context it is checked whether the direction of rotation inverts during the movement in a certain angular window of the actuator or whether the gradient of the rotational speed has a significant discontinuity. If this is the case, the algorithm sends information to all other components of the software that a shift operation should expediently be restarted and repeated.

It is generally expedient to interrupt the actuating operation early on, already upon identification of a dog-to-dog event, and to reverse the previously inverted "reverse" actuating movement of the shift fork as quickly as possible in order to attempt a new shift operation. In this way, a part of the spent actuating energy transmitted by the pulse can be converted to direct the movement vector of the shift fork and of the thereby moved sliding sleeve back toward the target gear. These identification steps can be repeated several times if necessary, in which context identical repetition processes do not always have to follow one another, because the shift operations may have been aborted at different points in time. Essentially, however, the same measures are repeatedly taken when the target gear is to be engaged again.

It can furthermore be provided in the method according to the invention that at least the movement speed and the movement curve of the shift fork and/or of the shift drum actuating the shift fork are detected and analyzed in connection with an incomplete engaging operation and possibly therewith associated jamming and/or therewith associated catching of the sliding sleeve with the cogwheel of the second gear ratio.

Thus, if a pressed fit or interference fit occurs at dog edges in the context of a dog-to-dog event because the shift fork continues to press without the dog actually having been able to be engaged, this can be identified by the detection of the speeds and movement curves of the shifting element or shift fork or of the shift drum in connection with it, and appropriate countermeasures can be initiated. Since such a pressed fit cannot be reliably disconnected by the above-described shifting procedure and by the above-described handling of dog-to-dog events, further steps for identification and remedy may be required.

In order to be able to identify such a specific dog-to-dog event, which can be characterized, in particular, by a mechanical pressed fit occurring, at least two, expediently, however, a total of three conditions are queried. First, it is checked if a dog-to-dog event is present. In addition, it can be queried and identified if the shifting element or the shift fork was moved slower than would normally have been expected. As a third criterion, it can be detected if the too low rotational speed of the shift drum activated for the movement of the shifting element or of the shift fork remains at this low level over a specific period of time.

In order to counter such an event, two different strategies in particular have been developed, which are explained in more detail below.

As one option to counter such a specific dog-to-dog event, which can also be regarded as a "long" dog-to-dog event, the method offers the possibility of reducing and/or varying in an oscillating manner an actuating power and/or a rotational speed of the shift drum at least once or several times in connection with an incomplete engaging operation and therewith associated jamming and/or catching of the sliding sleeve with the cogwheel of the second gear ratio. In order to thus resolve such a so-called "long" dog-to-dog event, the actuator or the shift drum can reduce its actuating power exerted on the shift fork in short intervals, whereby the mechanical coupling can be disconnected if necessary.

As a further option to counter such a specific dog-to-dog event, which can also be regarded as a "long" dog-to-dog event, the method offers the possibility of reducing and/or inverting a rotational speed of the shift drum once or several times in connection with an incomplete engaging operation and therewith associated jamming and/or catching of the sliding sleeve with the cogwheel of the second gear ratio. In order to resolve such a "long" dog-to-dog event, it can be expedient to actively move the shift fork away from the dog of the target gear and back toward the initial gear to actively force a disconnection of the mechanical coupling and then start a new engaging operation.

Preferably, however, the actuator does not move very far back in this context, but only a small distance away from the target gear, specifically at least far enough to ensure that a disconnection of the dog ring, which is slidable with the shift fork, from the dog of the target gear is possible, in order to subseqeuntly start a new engaging operation.

Another undesirable event to be seen in connection with the numerous variants of dog-to-dog events explained above, can be referred to and regarded as springing back, as bouncing back or as so-called "bouncing". This is a specific dog-to-dog event in which the dog ring springs back after a nearly completed shift operation so far that the initial gear is engaged again.

In one expedient method variant, it can thus be queried whether an unexpected return movement of the sliding sleeve out of the fit with the cogwheel of the second gear ratio into the cogwheel of the disengaged first gear ratio takes place in connection with a nearly complete or a complete engaging operation and therewith associated fit of the sliding sleeve with the cogwheel of the second gear ratio. In order to check whether this is the case, that is, whether the so-called bouncing" occurs, at least the movement speed and the movement curve of the shift fork and/or of the shift drum actuating the shift fork are detected and analyzed.

It should be pointed out in this context that such an operation with the shift fork springing back because of having stored so much energy that the initial gear is met with again, should be avoided because of the comparatively high risk of damage.

An expedient method variant in connection with a "bouncing", that is, with a specific dog-to-dog event, can in addition detect and check whether a return movement of the sliding sleeve out of the fit with the cogwheel of the second gear ratio into the cogwheel of the disengaged first gear ratio has taken place in connection with an incomplete engaging operation and therewith associated jamming and/or catching of the sliding sleeve with the cogwheel of the second gear ratio. If this is the case, at least the movement speed and the movement curve of the shift fork and/or of the shift drum actuating the shift fork are detected and analyzed.

In order to reliably identify such "bouncing", a separate algorithm monitors each dog-to-dog event for its pulse transmission and the distance covered by the shift fork, and thus detects the risk of bouncing. When there is a risk of bouncing, the reaction is comparatively quick in order to reduce occurring pulses in due time and in order to prevent damage in the transmission. In this way, it is generally possible to prevent the detrimental feedback into the initial gear.

Besides the various phenomena explained above in connection with changing gear ratios, overshooting can occur during the setting of the target position in certain, albeit rare, situations. In terms of its characteristic concomitants, such an overshoot process strongly resembles the previously explained "bouncing". If, for example, a stronger pulse is imparted to the shift fork due to an occurring and identified dog-to-dog event, overshooting can subsequently occur, which can result in an inadvertent re-disengagement of the dog ring connection. This results in a faulty shift operation, which is also often referred to as a so-called "misshift."

Another method variant can thus provide that at least the movement speed and the movement curve of the shift fork and/or of the shift drum actuating the shift fork are detected and analyzed in connection with an incomplete engaging operation and therewith associated jamming and/or catching of the sliding sleeve with the cogwheel of the second gear ratio and after a return movement of the sliding sleeve out of the fit with the cogwheel of the second gear ratio without establishing an engagement with the cogwheel of the disengaged first gear ratio.

A slightly altered method variant can optionally provide that at least the movement speed and the movement curve of the shift fork and/or of the shift drum actuating the shift fork are detected and analyzed in connection with a nearly complete or a complete engaging operation and therewith associated fit of the sliding sleeve with the cogwheel of the second gear ratio and after a return movement of the sliding sleeve out of the fit with the cogwheel of the second gear ratio without establishing an engagement with the cogwheel of the disengaged first gear ratio.

After identification of an overshoot, suitable countermeasures can be taken. In connection with suitable countermeasures, the positions of the shift fork and/or the sliding sleeve moved by the shift fork are constantly checked during engagement of the target gear in order to be able to intervene in due time as soon as the determined actual position deviates too far from a target position, and more specifically, in typical areas where overshoot can occur or has occurred. If deviations between actual positions and target positions exceeding a limit value are identified, the appropriate target position can be actively proceeded to, which can be done with the aid of an appropriate control vector that provides for the target position to be reached again within a very short time or very performantly, before an inadvertent disengagement of the dog ring connection can take place.

Optionally, it is also possible for an amplified and/or extended and/or at least partially or in sections repeated shift pulse for the movement of the shift fork to be initiated by the electric-motor direct drive of the shift drum after an identified return movement of the sliding sleeve out of the fit with the cogwheel of the second gear ratio.

In rare cases it is also possible that an applied actuating pulse and/or movement pulse of the actuating elements involved in the shift operation may be too small to achieve the desired target gear, which can be considered as undershoot. Such an actuating pulse can essentially depend on the movable parts in the transmission that are involved in translational movements in connection with actuating operations and/or gear change operations.

Both overshoot and undershoot should be prevented, which is why a suitable remedy should be provided in each case. Such an undershoot can be regarded as so-called "creep" of the shift sleeve or of the shift fork sliding the shift drum into the target gear.

A corresponding method variant can provide that a sliding speed below a defined minimum shift speed is identified for the sliding sleeve by detection and evaluation of the rotational energies stored in the gear pairs and/or in the shift drum, and a rotational speed of the gear pair of the second gear ratio to be brought into engagement is increased. In order to provide a remedy for this, a vector difference is added to the shift fork or to the sliding sleeve during the actuating movement, which procedure can be referred to as undershoot handling.

Undershoot can moreover also be countered by accelerating the cogwheels to apply the rotational energy required in order to in such a way engage the target gear with the desired pulse. This is expedient because the engaging operation can be completed in this way before another dog impact causes the system to disengage again.

In addition, another advantageous method variant provides for a current consumption of the electric-motor direct drive of the shift drum to be detected and evaluated in each case in connection with individual, with selected, or with all performed change operations of gear ratios. Since it is generally technically possible and useful to detect the current consumption of the drive motor for the shift drum in all gear change operations, this monitoring can be advantageously used to identify a mechanical overload by a limit value for the current consumption being exceeded.

This provides a function in the method according to the invention and in the transmission control to protect at least the electronic components and the electrical components from overload due to too high electrical currents.

One variant of the method can provide that the exceeding or falling below of a defined threshold value is monitored during the detection of the current consumption of the electric-motor direct drive of the shift drum, where, after an exceeding of the threshold value, a current integral is calculated, which is reset to a value of zero upon a subsequent falling below of the threshold value. In this context, the current flowing through the motor windings and through the power/control electronics is permanently measured, and it is checked whether a threshold value is reached; if the threshold value is reached or exceeded, a current integral is formed which is reset to a value of zero upon a falling below of the threshold value.

In addition, in another variant of the method, a continuous calculation of the current integral can be performed so that after a limit value has been exceeded, at least the drive control of the shift drum is interrupted and further shift operations are thus suppressed. In this connection, and after the definable limit value has been exceeded, the entire control can be switched off in order to prevent overloads in this way.

It can moreover be expedient to activate the drive control of the shift drum again after a defined time interval has elapsed. In this case, the control can be enabled again after a defined time has elapsed, since it can then be assumed that the control has cooled down again and is ready to continue operating.

However, it can also be provided in the method that a permanent emergency shutdown can or should take place after this emergency shutdown has occurred again or has been repeated several times, since in such cases it can or must be assumed that there is damage in the mechanical system and/or in the control.

All above-explained events, abnormalities in the shifting procedure, or all occurring errors can additionally be logged, as each error case can be assigned a defined identification number, so that the user or an evaluation system can thus be notified unequivocally and clearly at what time which error or which event occurred.

Besides the method explained in numerous variants in order to solve the already above-mentioned objects, the present invention additionally proposes a torque-converting and/or speed-converting variable-speed transmission which has an input shaft and an output shaft and at least two gear ratios, each of which is assigned at least one changeable gear pair. In the variable-speed transmission, shifting elements act on sliding sleeves that are connected to and/or bringable into operative engagement with the gear pairs and are able to change these gear pairs, in which context the shifting elements are in engagement with a shift drum that is bringable into defined angular positions and rotatable between these angular positions.

The shift drum is coupled with an electric-motor direct drive, in particular, one that is formed by a brushless DC motor or by a permanently excited synchronous motor, which can rotate the shift drum and bring it into the particular defined angular positions in order to change gear ratios. In addition, the electric-motor direct drive of the shift drum is assigned at least one device and/or one sensor for the detection of the electric supply currents upon actuations of the shift drum in connection with change operations of gear ratios. In this way, the control of the change operations of gear ratios can be carried out at least based on the detected supply currents of the electric-motor direct drive of the shift drum under further consideration of data on rotational energies of the cogwheels involved in the particular change operation and/or of gear pairs in meshing engagement therewith.

The variable-speed transmission according to the invention can have, in particular, a suitable device to control all change operations of gear ratios, which device can preferably take into consideration the output signals of at least one sensor assigned to the shift drum, in which context the at least one sensor is provided for the detection of rotational speeds and/or of accelerations of the shift drum in change operations of gear ratios.

Such a sensor can be realized, for example, by a suitable position sensor, which can typically be an integral part of the drive motor and—being a direct drive—can thus distinctly indicate the particular position of the shift drum. Generally, such a sensor can also be an absolute position encoder, which is based on a non-contact encoder and realized, for example, by magnets or the like that are fixed or glued into the shaft.

Generally, it should be pointed out that the variable-speed transmission according to the invention can be operated with a control method according to one of the previously described embodiment variants to carry out change operations of gear ratios. The transmission may, in particular, be a sequentially shifting transmission.

It should be explicitly mentioned at this point that all aspects and embodiment variants explained in the context of the variable-speed transmission according to the invention can likewise pertain to or constitute partial aspects of the method according to the invention to control the variable-speed transmission. If specific aspects and/or interrelations and/or effects relating to the variable-speed transmission according to the invention are referred to at some point in the present description or in the claims definitions, this therefore likewise pertains to the method according to the invention.

The same applies conversely, so that all aspects and embodiment variants explained in the context of the method according to the invention to control the variable-speed transmission can likewise pertain to or constitute partial aspects of the variable-speed transmission according to the invention, which can be controllable in such a way, that is, by the method. If specific aspects and/or interrelations and/or effects relating to the method according to the invention are referred to at some point in the present description or in the claims definitions, this therefore likewise pertains to the variable-speed transmission according to the invention.

Optionally, the drive motor for the shift drum drive can be a brushless or so-called torque motor, which due to its specific purpose of application can be classified into the category of so-called low-speed motors. Such brushless motors or torque motors not only generally have a high power density, but also require a relatively low supply power compared to drive motors as used up to now. Another generally suitable drive motor for the shift drum drive is a permanently excited synchronous motor, as it also has a comparatively high power density and likewise requires only a low supply power.

With a typical current consumption of less than one ampere, such torque motors or permanently excited synchronous motors can help save weight and installation space, which is generally advantageous for vehicle drives in mobile applications. The drive motor can be designed optionally either as an internal rotor or as an external rotor.

BRIEF DESCRIPTION OF THE FIGURES

In the following passages, the attached figures further illustrate typical embodiments of the invention and their advantages. The size ratios of the individual elements in the figures do not necessarily reflect the real size ratios. It is to be understood that in some instances various aspects of the invention may be shown exaggerated or enlarged in relation to other elements in order to facilitate an understanding of the invention.

DETAILED DESCRIPTION OF THE INVENTION

The same or equivalent elements of the invention are each designated by the same reference numbers in the following description of figures. Furthermore and for the sake of clarity, only the reference numbers relevant for describing the individual figures are provided. It should be understood that the detailed description and specific examples of the shift drum of the variable-speed transmission according to the invention, along with its electric direct drive as well as the method for controlling the variable-speed transmission, while indicating preferred embodiments for the purpose of the invention, are intended for purposes of illustration only and are not intended to limit the scope of the invention.

Figure 1:
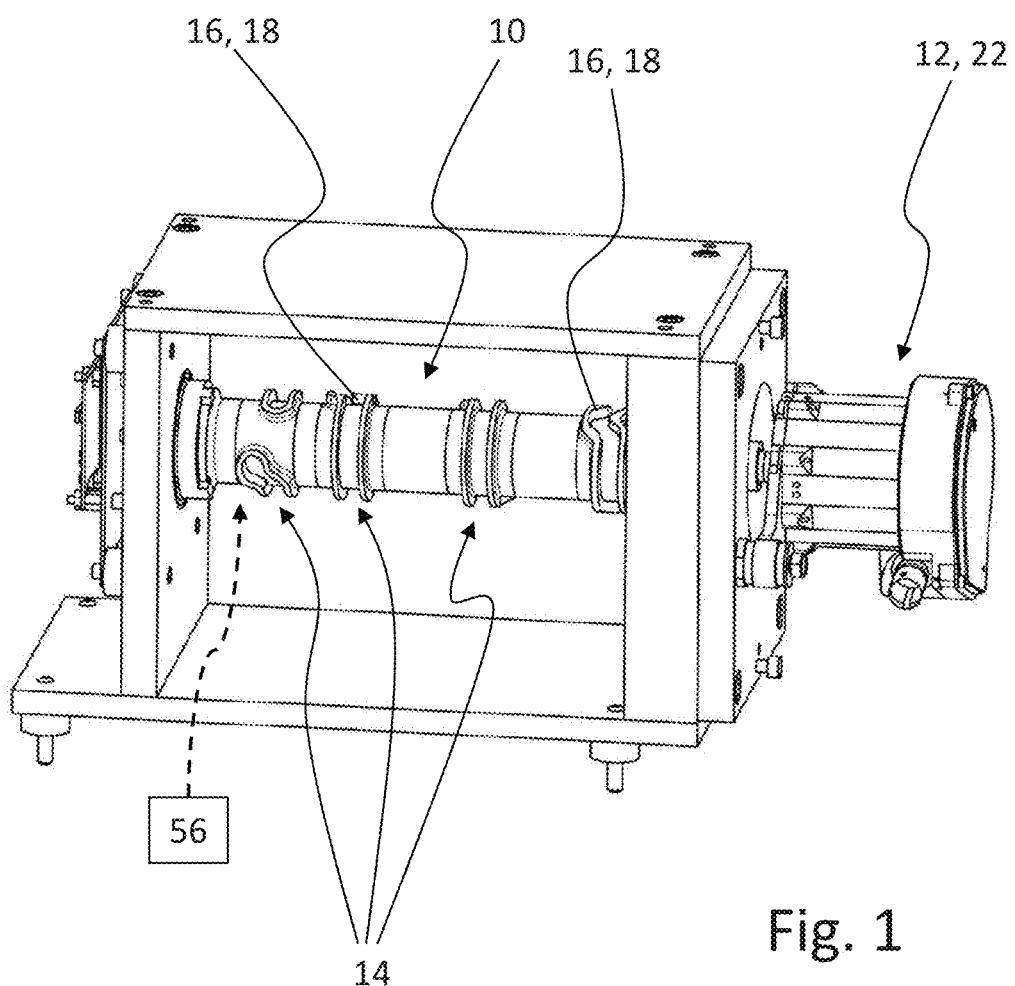
FIG. 1 shows a schematic perspective view of a configuration for the bearing and arrangement of a rotatable shift drum for a variable-speed transmission and of an electric-motor direct drive coupled with the shift drum.

The schematic perspective view of FIG. 1 illustrates a configuration for the bearing and arrangement of a rotatable shift drum 10 for an embodiment variant of a variable-speed transmission not shown in more detail here. The rotatably mounted shift drum 10 is coupled with an electric-motor direct drive 12, which serves as drive motor for the shift drum 10 and which can rotate the shift drum in both directions of rotation as required.

A here non-illustrated part of the present invention is a torque-converting and/or speed-converting variable-speed transmission with an input shaft coupled, for example, with an internal combustion engine which is operable at a comparatively high rotational speed level and in a wide rotational speed range, and with an output shaft coupled, for example, with a vehicle axle drive or a vehicle wheel drive requiring a significantly lower rotational speed level but higher torques than the internal combustion engine. The same generally applies to electric-motor vehicle drives as well, as with these drive motors it is normally also expedient to have at least two gear ratios, which can be likewise provided by a mechanical variable-speed transmission for speed conversion and torque conversion.

In order to enable the speed conversion and torque conversion between the internal combustion engine or the electric motor and the axle drive or wheel drive of the vehicle, the variable-speed transmission not illustrated here has at least two gear ratios with at least two changeable gear pairs, the cogwheels of these at least two changeable gear pairs each being mounted on shafts and/or rotating on or with these shafts, which are mounted in a gearbox housing or mounted otherwise. Typically, these cogwheels are each assigned rotatable claw rings mounted on the shafts, which claw rings can be slid along the shafts in axial direction in order to be able to bring different gear pairs into a meshing engagement according to the desired gear ratio by using the below-described shifting elements.

Since the variable-speed transmission is, in particular, a sequentially shifting, so-called dog ring transmission or a so-called dog box, the claw rings are designed as so-called dog rings, for which an axial engagement with the corresponding dog rings is performed via few large teeth, which are moreover slightly undercut. The same number of teeth are on the front faces of the cogwheels that are bringable into engagement with the claw rings or sliding sleeves. The shift sleeves or claw rings and the cogwheels can each have four or six large teeth, for example, and the ratio between tooth and space can be approximately 30:70 over the front-face engagement ring of the shift sleeves or claw rings and the cogwheels.

In order to be able to realize the desired meshing engagements, the variable-speed transmission comprises suitable shifting elements, for example, in the form of movable shift forks, shift pins, or the like (not shown here), which generally act on the already mentioned but here also not illustrated sliding sleeves, which are connected to the claw rings of the gear pairs or to the cogwheels of the gear pairs and are able to change these gear pairs or cogwheels, which change can mean, in particular, an axial sliding of the claw rings or sliding sleeves assigned to the cogwheels and mounted on the shafts.

The mentioned shifting elements, which can be formed, for example, by movable or slidable or swivelable shift forks or shift pins, are guided by the rotatable or swivelable shift drum 10 and are therefore in engagement with the guide plates 14 formed in a defined manner and are in this way in operative connection with the shift drum 10 that is bringable into defined angular positions and rotatable between these angular positions. In the exemplary embodiment shown, the guide plates 14 are formed by groove guides 16 extending along the circumference of the shift drum 10, which is designed as a cylindrical shaft of defined outer diameter, and which can have curvatures 18 at some points along its circumference and end stops (not designated separately) at other points.

Under certain circumstances, it is not always possible to prevent such a pop-out with such dog ring transmissions, as will be explained in detail below with reference to the following FIGS. 2A to 3C.

As schematically indicated in FIG. 1, the rotatable shift drum 10 has the shown electric-motor direct drive 12, by which the shift drum 10 can be rotated by defined rotation angles in a very precise manner and thus be brought into the particular defined angular positions. Optionally, the electric-motor direct drive 12 of the shift drum 10 can be formed by a brushless DC motor 22 or by a permanently excited synchronous motor coupled directly to the shift drum 10, that is, without interposition of a transmission or a deflection or the like.

Due to its specific purpose of application, such a drive motor 12 formed by a brushless DC motor 22 (or by a permanently excited synchronous motor) belongs to the category of the so-called low-speed motors and can also be referred to as torque motor. Such torque motors have relatively high torques at a comparatively low rotational speed level, as is also required for the present purpose of application, because the drive motor 12 acts via the direct coupling with the shift drum 10 directly upon the shifting elements to be moved, which in turn interact with the variable-speed transmission's gear pairs, which are potentially under load, and the shifting elements must slide the gear pairs along the gear shafts.

Even though a frame arrangement used to bear the shift drum 10 and to fasten the drive motor 12 directly coupled with the shift drum 10 is discernible from FIG. 1, this frame structure is not necessarily to be understood as a concrete installation situation in a variable-speed transmission. However, an expedient embodiment variant of the variable-speed transmission according to the invention can provide that the electric-motor direct drive 12 directly that is coupled and in fixed rotational connection with the shift drum 10 is a pluggable module and/or quickly exchangeable and/or exchangeable without tools, which can be advantageous either for easy exchangeability with differently dimensioned drive motors 12 with different transmission sizes and/or for easy accessibility for maintenance purposes.

Such brushless DC motors 22 or permanently excited synchronous motors as rotary drives for shift drums 10 of variable-speed transmissions allow a high power density and thus a particularly compact construction, so that any gearbox ratios between shift drum 10 and drive motor 12 can be dispensed with. In addition, such a compact motor 12 with high power density offers various advantages regarding packaging, because there is a high degree of variability for the installation of the drive motor 12, which can be accommodated without any problems inside the gearbox housing, so that a shaft passage through the gearbox housing to the outside for the drive of the shift drum 10 can be dispensed with.

As already explained above, the transmission equipped with the shift drum 10 shown in FIG. 1 is a sequentially shifting transmission designed as a so-called dog box (not shown), which is characterized, among others, by the fact that it can be shifted with comparatively short shift times and without the soft synchronization known from conventional variable-speed transmissions.

Figure 2A:
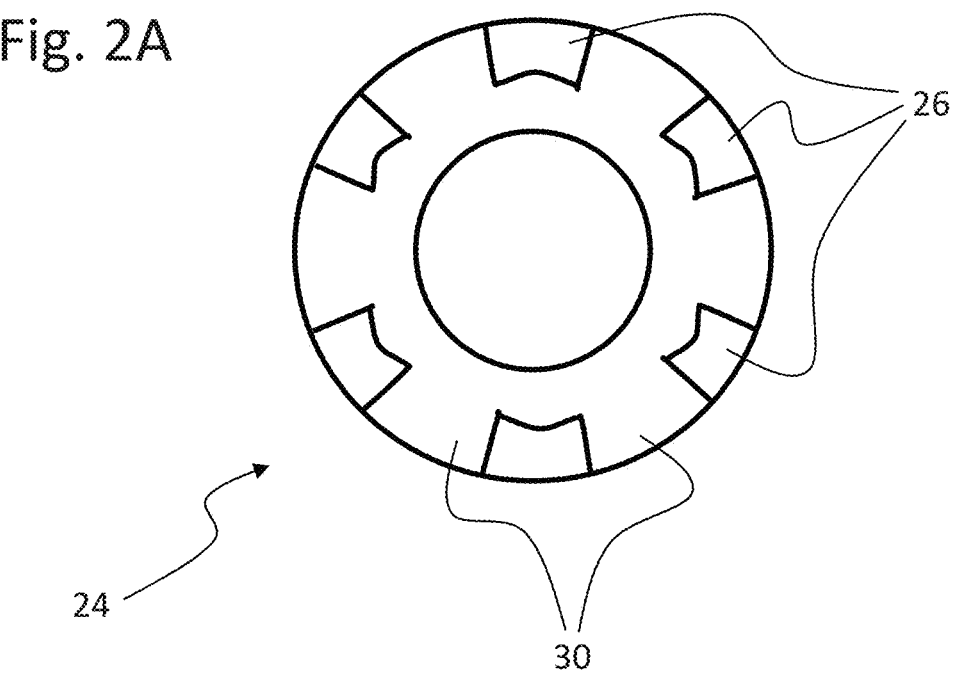
FIG. 2A shows a schematic top view of an embodiment variant of a shift sleeve of a variable-speed transmission.

A shift sleeve 24 as shown in schematic top view in FIG. 2A and as used in such dog ring transmissions or dog boxes does not have the usual larger number of small engagement teeth for axial engagement with the cogwheels to be shifted, but mostly only few large teeth 26, which are moreover preferably slightly undercut, which is, however, not illustrated in the schematic view of FIG. 2A.

Figure 2B:
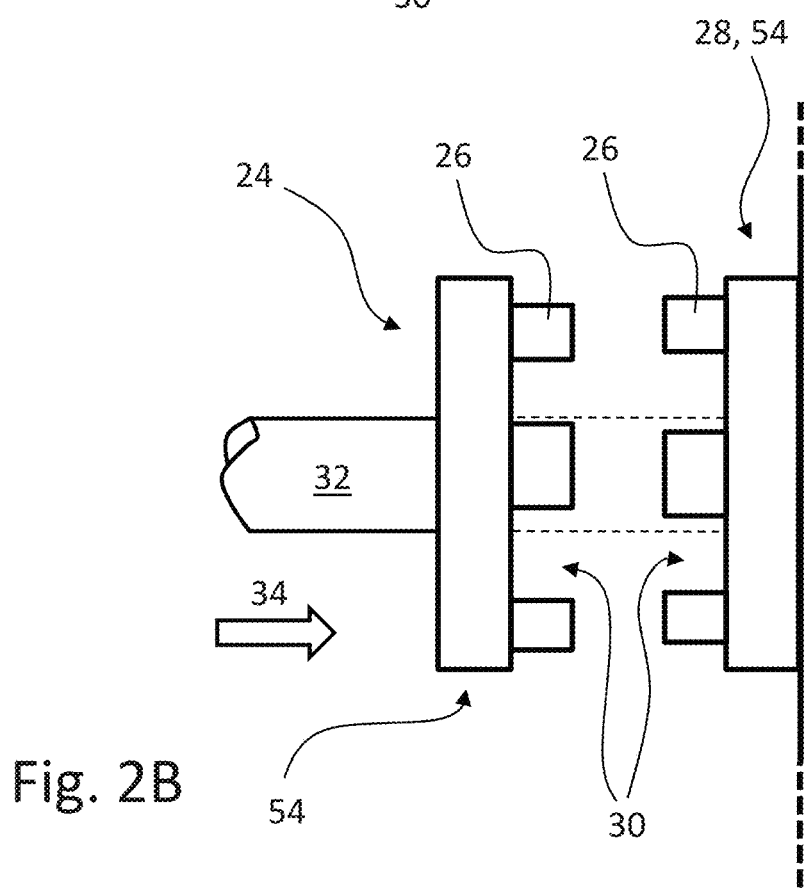
FIG. 2B shows a schematic side view of a meshing engagement of a shift sleeve according to FIG. 2A with a cogwheel of a sequentially shifting variable-speed transmission.

The same number of teeth 26 are on the front faces of the cogwheels 28 that are bringable into engagement with the sliding sleeves 24 (cf. the schematic schematic view of FIG. 2B). The shift sleeves or sliding sleeves 24 and the cogwheels 28 can each have four or six large teeth 26, for example, and the ratio between tooth 26 and space 30 can be approximately 30:70 over the front-face engagement ring of the shift sleeves or sliding sleeves 24 and the cogwheels 28, which is in particular intended to reduce the risk of a tooth 26 of the shift sleeve or sliding sleeve 24 impacting with a tooth 26 of the cogwheel 28 during the shift operation, in which the shift sleeve or sliding sleeve 24, which is actuated by a shift fork (not shown), is slid along the gear shaft 32 in axial direction 34 against the front face of the cogwheel 28, as can be gathered from the schematic side view of FIG. 2B.

Practical shifting experience has shown that numerous control measures, such as those that are the object of the present invention, are useful and necessary for smooth shifting procedures in which the teeth 26 engage without any problems. It is thus a generally expedient measure when activating or deactivating a gear ratio and/or when changing gear ratios of the variable-speed transmission to take into consideration in each case at least the rotational energies of the cogwheels involved and/or of the gear pairs in meshing engagement therewith. This applies when undoing an engagement of the sliding sleeve 24 with a cogwheel 28 of the gear pair of a first gear ratio, for example, in which the at least one sliding sleeve 24 is axially slid and disengaged from the cogwheel of the gear pair of the first gear ratio (not shown here).

This likewise applies when establishing an engagement of the sliding sleeve 24 with a cogwheel 28 of the gear pair of a second gear ratio, in which the sliding sleeve 24 is also axially slid (in direction 34, cf. FIG. 2B) and brought into engagement with the cogwheel 28 of the gear pair of the second gear ratio. In these mentioned operations of sliding, shifting, and gear changing, the rotations of the shift drum 10 (cf. FIG. 1) are in each case coordinated with the particular rotational speeds of the cogwheels 28 to be brought out of or into engagement with the sliding sleeves 24, with in each case at least the rotational energies of the cogwheels 28 in question and/or of gear pairs in meshing engagement therewith being at the same time taken into consideration.

Carrying out such shifting procedures as are described here requires the use of electronic shift programs for the rotations of the shift drum 10 and the therewith caused actuation steps of the shift forks or shifting elements interacting with the sliding sleeves or shift sleeves 24, in which context the electronic shift programs are able to take into consideration diverse constraints and conditions and/or to refer to different characteristic maps that are necessary for failure-free and quick shift operations.

One of these core functions lies in preventing potentially occurring undershoot and/or overshoot processes of an actual position as far as possible during the setting of the target position and thus of the target gear, and to reduce these as far as possible, since these states entail the risk that the particular target gear is disengaged again, which can involve damage to the mechanical system, in particular to the shift sleeve in question and/or to the dog ring in engagement therewith or in question. Furthermore, and depending on the error signal of the positions, premature braking of the gear pair of the target transmission is also not advisable, as this can likewise lead to damage during the engaging of the gear and can moreover result in a significant loss in shift performance.

As already explained above and as schematically illustrated by the FIGS. 2A and 2B, the dog rings or shift sleeves 24 of sequential transmissions have a comparatively small number of teeth 26, which moreover usually have undercuts, so that a comparatively hard engagement takes place between the corresponding toothings of the shift sleeves 24 and the adjacent front-face dog rings of the cogwheels 28 of the various gear ratios, and it is also necessary for a successful shift operation for this hard engagement to take place.

During an engaging operation for the sliding sleeve 24 into a cogwheel 28 of a second gear ratio to be activated, a positive fit has to be found out for the sliding sleeve by detecting a torque curve and/or speed curve of the electric-motor direct drive 12 of the shift drum 10 and/or by detecting the speed curves of the rotating parts of the transmission, such as the gear shaft 32, and by identifying therefrom whether the sliding sleeve 24 has been able to establish the engagement with the cogwheel 28 of the second gear ratio to be activated. When a dog ring or sliding sleeve 24 is moved toward a cogwheel 28 of a target gear, an attempt is made in this context for the dog ring or sliding sleeve 24 to meet with the in each case appropriate "tooth space" in order for the dog rings to engage. By detecting the speed curve and the current consumption in the drive motor 12 for the shift drum 10, it is at the same time possible to identify whether the dog "takes grip" and engages or "springs back", which is transmitted as a pulse via the shift fork and introduced into the shift drum 10.

In the course of each shift operation, there is generally a given probability of a so-called dog or tooth 26 impacting with a dog or tooth 26 of the target gear. The dogs or teeth 26 of the target gear corresponding to the dogs or teeth 26 of the shift sleeve 24 are mounted on the gear ring 28 of the target gear and are thus part of the rotating components of the transmission. Several dogs or teeth 26 are fastened to a gear at an angular distance. The distance between two dogs or teeth 26 spanning a common angle is called dog window, which is illustrated in FIG. 2A and in FIG. 2B as space 30 between adjacent teeth 26. The dog or tooth 26 located on the shift sleeve 24 and being moved into the target gear with the shift fork is mechanically disconnected from the dog rings or cogwheels 28 of the gears and must be transported into a dog window or space 30 of the target gear in order for a gear to be engaged.

Figure 3A:
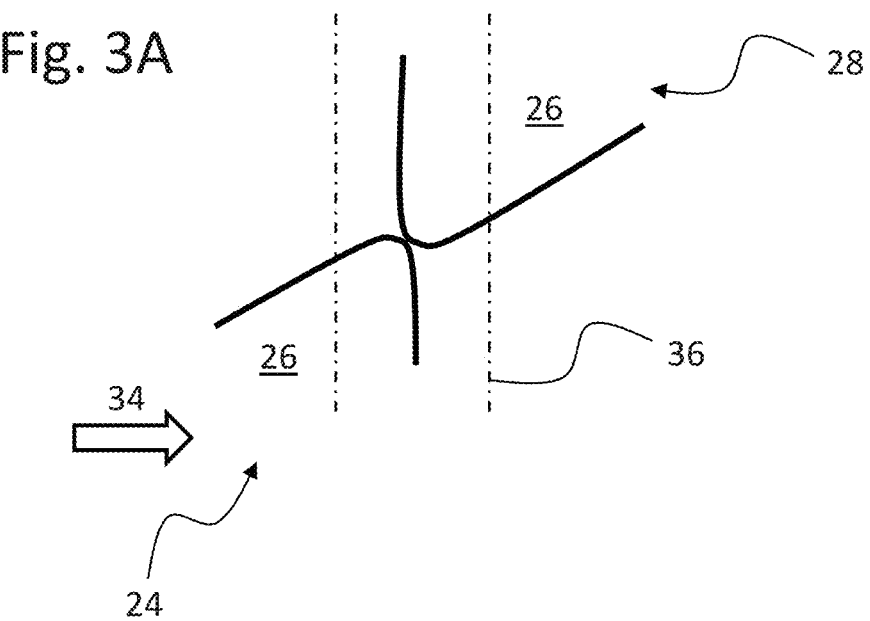
FIG. 3A shows a detailed view of a contact situation of two teeth of a shift sleeve or of a cogwheel in initial meshing engagement.

If, according to FIG. 3A, the dog or tooth 26 of the shift sleeve 24 impacts with a dog or tooth 26 of the cogwheel 28 of the target gear during the axial sliding 34 in the engagement phase, that is, within an axially delimited contact area 36 or dog window 36, a pulse is converted in this context which causes energy to be transmitted to the shift fork. According to the energy input, it is possible that the translational vector of the shift fork is inverted and the target gear is disengaged again toward the initial gear. This operation is also referred to a dog-to-dog event in the present context.

These faulty engaging operations known as dog-to-dog events have proven to occur relatively frequently in shift operations of any kind. Since these events in each case lead to pronounced discontinuities in the control procedures, it is expedient to detect such dog-to-dog events in order to be able to initiate useful countermeasures.

For this purpose, the method according to the invention provides a specific algorithm, which identifies such a dog-to-dog event on the basis of the rotational speed and direction of movement of the actuator or of the shifting element actuated by the shift drum 10 or of the shift fork moved by the shift drum 10. If necessary, this identifying can be carried out indirectly by the analysis of the current consumption and the speed curve at the drive 12 of the shift drum 10, since the specific characteristics of such dog-to-dog events are quite accurately determinable and are therefore also identifiable in the normal shifting procedure.

When a dog-to-dog event is identified, it is in particular possible to check whether the direction of rotation inverts during the movement in a certain angular window of the actuator or of the shift drum 10 or whether the gradient of the rotational speed has a significant discontinuity. If this is the case, the algorithm sends information to all other components of the software.

Figure 3B:
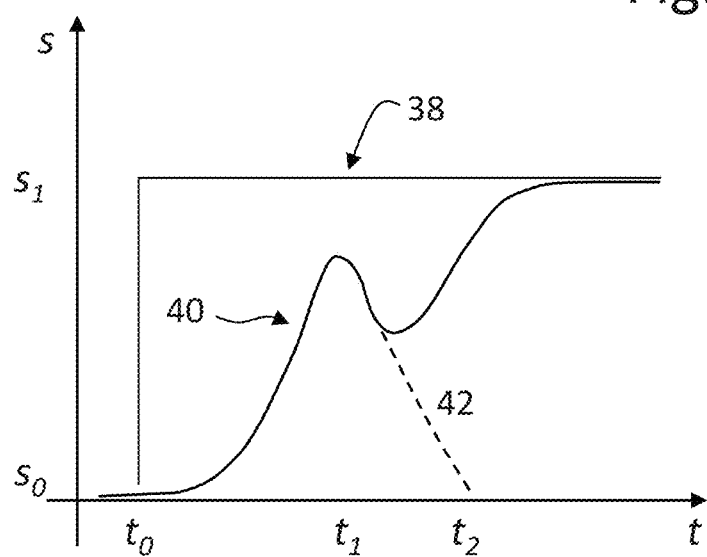
FIG. 3B shows an ideal-type shift curve as well as an unsuccessful engaging operation in the qualitative path-time diagram.

In a schematic diagram that is to be understood as qualitative, FIG. 3B illustrates an ideal-type shifting procedure 38 over the shift time t, in which shifting procedure 38 the shift path s already springs at a shift time point $t_0$ to a shift path $s_1$, which corresponds to an engaged gear ratio with the teeth 26 of the sliding sleeve 24 and the cogwheel 28 (cf. FIG. 2B) in complete engagement.

However, since such an ideal-type shifting procedure 38 cannot be realized in practice, it is necessary after the absolutely probable occurrence of a dog-to-dog event, which can correspond to an unsuccessful engaging operation, and/or after an unsuccessful attempt to establish an engagement between sliding sleeve 24 and cogwheel 28 of the second gear ratio to be activated, that the engaging operation is repeated at least once or several times, as required, by corresponding reverse rotation and repeated rotation of the shift drum 10 with correspondingly guided shift fork.

Such a possible real-type shifting procedure 40 is exemplarily illustrated in FIG. 3B by the solid curve, which has a first step 42 at a time $t_1$ with reversal of the direction of movement of the shift path s, which illustrates an inversion 42 of the translational vector of the shift fork and therewith associated disengagement of the dog away from the target gear back toward the initial gear. If this inversion 42 is not counteracted by a renewed positive rotary movement of the shift drum 10 with corresponding movement of the shift fork and therewith associated renewed sliding 34 of the shift sleeve 24 toward the cogwheel 28, which procedure corresponds to a partial repetition of the procedures of the shift operation, the curve takes the downward course of the dashed line in direction $s_0$, which corresponds to a failed engaging operation at time $t_2$ with teeth 26 of the shift sleeve 24 not coming into proper engagement, which can correspond to a so-called dog-to-dog situation with a pronounced kickback or rebound of the shift sleeves.

Figure 3C:
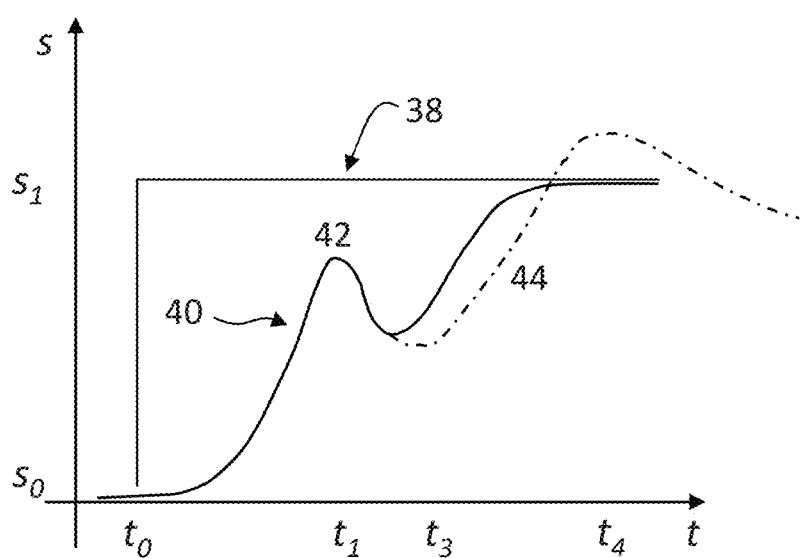
FIG. 3C shows an ideal-type shift curve as well as an inverted and overshooting engaging operation in the qualitative path-time diagram.

Another possible real-type shifting procedure 40 is exemplarily illustrated in FIG. 3C by the solid curve, which has the indicated reversal of the direction of movement of the shift path s after the first step 42 at a time $t_1$, which represents an inversion 42 of the translational vector of the shift fork and therewith associated disengagement of the dog away from the target gear back toward the initial gear. This inversion 42 is, however, counteracted at time $t_3$ by a renewed positive rotary movement of the shift drum 10 with corresponding movement of the shift fork and therewith associated renewed sliding 34 of the shift sleeve 24 toward the cogwheel 28, however, with a stronger pulse than is expedient, thus producing an overshoot 44, which is illustrated as a dashed-and-dotted curve in FIG. 3C. If the shift path would not be limited by the stop at $s_1$, the axial sliding of the shift sleeve 24 would extend beyond this stop $s_1$ and possibly swing back in the manner shown at a time $t_4$.

As is illustrated by the FIGS. 3B and 3C, the perpetually recurring dog-to-dog events and the therewith associated faulty engaging operations or engaging attempts can be detected and/or identified at least based on the detection of the rotational speeds of the cogwheel or cogwheels of the second gear ratio and/or based on the detection of the angular velocity and/or of the rotation angle of the shift shaft 10 and/or of the drive torque of the electric-motor direct drive 12 to be applied for the rotation of the shift shaft. In this context, the period of time is relevant that lies between the beginning of the shift operation at to and the end of the intended successful engaging operation between $t_3$ and $t_4$ (cf. FIG. 3B und FIG. 3C).

It is checked in this context whether the direction of rotation inverts during the movement in a certain angular window of the actuator or shift shaft 10 falling into this period of time or whether the gradient of the rotational speed has a significant discontinuity. If this is the case, the algorithm sends information to all other components of the software that a shift operation should expediently be restarted and repeated.

According to FIG. 3C, it is generally expedient to interrupt the actuating operation early on, already upon identification of a dog-to-dog event, and to reverse the previously inverted "reverse" actuating movement of the shift fork as quickly as possible in order to attempt a new shift operation. In this way, a part of the spent actuating energy transmitted by the pulse can be converted to direct the movement vector of the shift fork and of the thereby moved sliding sleeve 24 back toward the target gear. These identification steps can be repeated several times if necessary, in which context identical repetition processes do not always have to follow one another, because the shift operations may have been aborted at different points in time. Essentially, however, the same measures are repeatedly taken when the target gear is to be engaged again.

Figure 4:
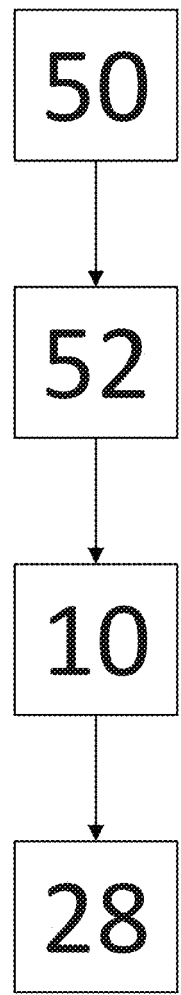
FIG. 4 shows a schematic view of the arrangement of the shifting elements, sliding sleeves, shift drum, and cogwheels.

FIG. 4 shows a schematic view of the arrangement of the shifting elements (50), sliding sleeves (52), shift drum (10), and cogwheels (28) of gear pairs (54), such that the shifting elements act on sliding sleeves connected to the gear pairs or the cogwheels of the gear pairs.

It is generally expedient in the described method variants to detect and evaluate a current consumption of the electric-motor direct drive 12 of the shift drum 10 in each case in connection with individual, with selected, or with all performed change operations of gear ratios. Since it is generally technically possible and useful to detect the current consumption of the drive motor 12 for the shift drum 10 in all gear change operations, this monitoring can be advantageously used to identify a mechanical overload by a limit value for the current consumption being exceeded. This provides a function in the method according to the invention and in the transmission control to protect at least the electronic components and the electrical components from overload due to too high electrical currents.

All above-explained events, inconsistencies in the shifting procedure, or all occurring errors can additionally be logged, as each error case can be assigned a defined identification number, so that the user or an evaluation system can thus be notified unequivocally and clearly at what time which error or which event occurred.

The invention also relates to a method used to control a torque-converting and/or speed-converting variable-speed transmission, which has an input shaft and an output shaft and at least two gear ratios, each of which is assigned at least one changeable gear pair, wherein shifting elements act on sliding sleeves connected to and/or bringable into operative engagement with the gear pairs and being able to change these gear pairs, wherein the shifting elements are in engagement with a shift drum (10), which is bringable into defined angular positions and rotatable between these angular positions, wherein the shift drum (10) is coupled with an electric-motor direct drive (12), which can rotate the shift drum (10) and bring it into the particular defined angular positions in order to change gear ratios, wherein upon activating or deactivating a gear ratio and/or upon changing gear ratios of the variable-speed transmission, the rotations of the shift drum (10) are coordinated with the particular rotational speeds of the cogwheels (28) to be brought out of or into engagement with the sliding sleeves (24), wherein in each case at least the rotational energies of the cogwheels (28) in question and/or of gear pairs in meshing engagement therewith are taken into consideration.

The invention also relates to a method in which the rotational energies of the rotating parts in engagement with the particular cogwheels (28) involved in a change of a particular gear ratio are taken into consideration.

The invention also relates to a method in which the rotational energies for different gear ratios are each weighted differently and/or are taken from tables or characteristic maps and each taken into consideration differently.

The invention also relates to a method in which the rotational energies of the shift drum (10) and/or of the electric-motor direct drive (12) driving the shift drum (10) are taken into consideration complementarily or separately.

The invention also relates to a method in which the electric-motor direct drive (12) of the shift drum (10) is electronically coupled with a drive control of a drive motor.

The invention also relates to a method in which a drive torque of the drive motor is reduced during and/or in preparation of a disengaging operation of a sliding sleeve (24) from a cogwheel (28) of a first gear ratio to be deactivated.

The invention also relates to a method in which the shift fork in operative engagement with the sliding sleeve (24) is preloaded with a defined and/or variable preload force during the disengaging operation, wherein the preload force is less than a shift force, which is only exerted on the shift fork when the drivetrain is load-free.

The invention also relates to a method in which the disengaging operation is performed after a shift request with a defined delay and in coordination with the behavior of the drive motor of which the drive torque has previously been reduced.

The invention also relates to a method in which, in preparation of or during an engaging operation, while the sliding sleeve (24) previously disengaged from the cogwheel of the deactivated first gear ratio is approaching an adjacent cogwheel (28) of a second gear ratio to be activated, a positive fit is found out for the sliding sleeve (24) by detecting a torque curve and/or speed curve of the electric-motor direct drive (12) of the shift drum (10) and identifying therefrom whether the sliding sleeve (24) has established the engagement with the cogwheel (28) of the second gear ratio to be activated.

The invention also relates to a method in which, after an unsuccessful engaging operation and/or after an unsuccessful attempt to establish an engagement between sliding sleeve (24) and cogwheel (28) of the second gear ratio to be activated, the engaging operation is repeated at least once or several times by repeated rotation of the shift drum (10) with correspondingly guided shift fork.

The invention also relates to a method in which an unsuccessful engaging operation and/or an unsuccessful attempt to establish an engagement between sliding sleeve (24) and cogwheel (28) of the second gear ratio to be activated is detected and/or identified at least based on the detection of the rotational speeds of the cogwheel (28) or cogwheels (28) of the second gear ratio and/or based on the detection of the angular velocity and/or of the rotation angle of the shift shaft (10) and/or of the drive torque of the electric-motor direct drive (12) to be applied for the rotation of the shift shaft (10).

The invention also relates to a method in which at least the movement speed and the movement curve of the shift fork and/or of the shift drum (10) actuating the shift fork are detected and analyzed in connection with an incomplete engaging operation and therewith associated jamming and/or catching of the sliding sleeve (24) with the cogwheel (28) of the second gear ratio.

The invention also relates to a method in which an actuating power and/or a rotational speed of the shift drum (10) is reduced and/or varied in an oscillating manner once or several times in connection with an incomplete engaging operation and therewith associated jamming and/or catching of the sliding sleeve (24) with the cogwheel (28) of the second gear ratio.

The invention also relates to a method in which a rotational speed of the shift drum (10) is reduced and/or inverted once or several times in connection with an incomplete engaging operation and therewith associated jamming and/or catching of the sliding sleeve (24) with the cogwheel (28) of the second gear ratio.

The invention also relates to a method in which at least the movement speed and the movement curve of the shift fork and/or of the shift drum (10) actuating the shift fork are detected and analyzed in connection with a nearly complete or a complete engaging operation and therewith associated fit of the sliding sleeve (24) with the cogwheel (28) of the second gear ratio and after a return movement of the sliding sleeve (24) out of the fit with the cogwheel (28) of the second gear ratio into the cogwheel of the disengaged first gear ratio.

The invention also relates to a method in which at least the movement speed and the movement curve of the shift fork and/or of the shift drum (10) actuating the shift fork are detected and analyzed in connection with an incomplete engaging operation and therewith associated jamming and/or catching of the sliding sleeve (24) with the cogwheel (28) of the second gear ratio and after a return movement of the sliding sleeve (24) out of the fit with the cogwheel (28) of the second gear ratio into the cogwheel of the disengaged first gear ratio.

The invention also relates to a method in which at least the movement speed and the movement curve of the shift fork and/or of the shift drum (10) actuating the shift fork are detected and analyzed in connection with an incomplete engaging operation and therewith associated jamming and/or catching of the sliding sleeve (24) with the cogwheel (28) of the second gear ratio and after a return movement of the sliding sleeve (24) out of the fit with the cogwheel (28) of the second gear ratio without establishing an engagement with the cogwheel of the disengaged first gear ratio.

The invention also relates to a method in which at least the movement speed and the movement curve of the shift fork and/or of the shift drum (10) actuating the shift fork are detected and analyzed in connection with a nearly complete or a complete engaging operation and therewith associated fit of the sliding sleeve (24) with the cogwheel (28) of the second gear ratio and after a return movement of the sliding sleeve (24) out of the fit with the cogwheel (28) of the second gear ratio without establishing an engagement with the cogwheel of the disengaged first gear ratio.

The invention also relates to a method in which, after identified return movement of the sliding sleeve (24) out of the fit with the cogwheel (28) of the second gear ratio, an amplified and/or extended and/or at least partially or in sections repeated shift pulse for the movement of the shift fork is initiated by the electric-motor direct drive (12) for the shift drum (10).

The invention also relates to a method in which, by detection and evaluation of the rotational energies stored in the gear pairs and/or in the shift drum (10), a sliding speed below a defined minimum shift speed is identified for the sliding sleeve (24), and a rotational speed of the gear pair of the second gear ratio to be brought into engagement is increased.

The invention also relates to a method in which a current consumption of the electric-motor direct drive (12) of the shift drum (10) is detected and evaluated in each case in connection with change operations of gear ratios.

The invention also relates to a method in which the exceeding or falling below of a defined threshold value is monitored during the detection of the current consumption of the electric-motor direct drive (12) of the shift drum (10), wherein, after an exceeding of the threshold value, a current integral is calculated, which is reset to a value of zero upon a subsequent falling below of the threshold value. The invention also relates to a method in which the current integral is continuously calculated, wherein, after exceeding a limit value, at least the drive control of the shift drum (10) is interrupted and further shift operations are thereby suppressed.

The invention also relates to a method in which the drive control of the shift drum (10) is activated again after a defined time interval has elapsed.

The invention also relates to a torque-converting and/or speed-converting variable-speed transmission, which has an input shaft and an output shaft and at least two gear ratios, each of which is assigned at least one changeable gear pair, wherein shifting elements act on sliding sleeves (24) connected to and/or bringable into operative engagement with the gear pairs and being able to change these gear pairs, wherein the shifting elements are in engagement with a shift drum (10), which is bringable into defined angular positions and rotatable between these angular positions, wherein the shift drum (10) is coupled with an electric-motor direct drive (12), which can rotate the shift drum (10) and bring it into the particular defined angular positions in order to change gear ratios, and wherein the electric-motor direct drive (12) of the shift drum (10) is assigned at least one device and/or one sensor (56) (shown with dashed line in FIG. 1) for the detection of the electric supply currents upon actuations of the shift drum (10) in connection with change operations of gear ratios, wherein the control of the change operations of gear ratios can be carried out at least based on the detected supply currents of the electric-motor direct drive (12) of the shift drum (10) under further consideration of data on rotational energies of the cogwheels involved in the particular change operation and/or of gear pairs in meshing engagement therewith.

The invention also relates to a variable-speed transmission in which the control of the change operations of gear ratios can take into consideration the output signals of at least one sensor assigned to the shift drum (10), wherein the at least one sensor is provided for the detection of rotational speeds and/or of accelerations of the shift drum (10) in change operations of gear ratios.

The invention also relates to a variable-speed transmission which can be operated with a control method carried out according to any of the inventive methods.

The invention has been described with reference to a preferred embodiment. Those skilled in the art will appreciate that numerous changes and modifications can be made to the preferred embodiments of the invention and that such changes and modifications can be made without departing from the spirit of the invention. It is therefore intended that the appended claims cover all such equivalent variations as fall within the true spirit and scope of the invention.

LIST OF REFERENCE NUMBERS

10 Shift drum
12 Direct drive, electric-motor direct drive
14 Guide plate
16 Groove guide
18 Curvature
22 Drive motor, DC motor, brushless DC motor
24 Shift sleeve
26 Tooth, claw
28 Cogwheel,
30 Space (between adjacent teeth or claws)
32 Gear shaft
34 Axial sliding direction
36 Contact area, dog window
38 Ideal-type shifting procedure
40 Real-type shifting procedure
42 Inversion
44 Overshoot
50 Shifting elements
52 Sliding sleeves
54 Gear pairs
56 Sensor

We claim:

1. A method used to control a torque-converting or speed-converting variable-speed transmission comprising an input shaft and an output shaft and at least two gear ratios, each of which is assigned at least one changeable gear pair, the method comprising:
   wherein shifting elements act on sliding sleeves connected to the gear pairs, including cogwheels, and being able to change these gear pairs,
   wherein the shifting elements are in engagement with a shift drum, which is bringable into defined angular positions and rotatable between these angular positions,
   wherein the shift drum is coupled with an electric-motor direct drive, which rotates the shift drum and brings it into the particular defined angular positions in order to change gear ratios of the variable-speed transmission,
   wherein upon changing gear ratios of the variable-speed transmission, the rotations of the shift drum is coordinated with the particular rotational speeds of cogwheels,
   wherein, during changing gear ratios, at least the rotational energies of the cogwheels of the gear pairs are taken into consideration, and
   wherein the rotational energies of the rotating parts in engagement with the particular cogwheels involved in a change of a particular gear ratio are taken into consideration during changing gear ratios, and
   wherein rotational energies for different gear ratios are each weighted differently or are taken from tables or characteristic maps and each is taken into consideration differently during changing gear ratios.

2. The method of one of the claim 1, wherein the rotational energies of the shift drum or of the electric-motor direct drive driving the shift drum are taken into consideration complementarily or separately during changing gear ratios.

3. The method of claim 1, further comprising reducing a drive torque of the drive motor during or in preparation of a disengaging operation of a sliding sleeve from a cogwheel of a first gear ratio to be deactivated.

4. The method of claim 3, wherein the electric-motor direct drive of the shift drum is electronically coupled with a drive control of a drive motor.

5. The method of claim 4, further comprising preloading a shift fork, in operative engagement with the sliding sleeve, with a defined or variable preload force during the disengaging operation, wherein the preload force is less than a shift force, which is only exerted on the shift fork when the drivetrain is load-free.

6. The method of claim 5, further comprising performing the disengaging operation after a shift request with a defined delay and in coordination with the behavior of the drive motor of which the drive torque has previously been reduced.

7. The method of one of the claim 1, wherein, in preparation of or during an engaging operation, while the sliding sleeve previously disengaged from the cogwheel of the deactivated first gear ratio is approaching an adjacent cogwheel of a second gear ratio to be activated, finding a positive fit for the sliding sleeve by detecting a torque curve or speed curve of the electric-motor direct drive of the shift drum and identifying therefrom whether the sliding sleeve has established the engagement with the cogwheel of the second gear ratio to be activated.

8. The method of claim 7, wherein, after an unsuccessful engaging operation, repeating the engaging operation at least once by repeated rotation of the shift drum with correspondingly guided shift fork.

9. The method of claim 8, further comprising detecting an unsuccessful engaging operation by detecting the rotational speeds of the cogwheel of the second gear ratio, or by detecting the angular velocity or of the rotation angle of the shift shaft or of the drive torque of the electric-motor direct drive to be applied for the rotation of the shift shaft.

10. The method of claim 9, further comprising detecting and analyzing at least the movement speed and the movement curve of the shift fork or of the shift drum actuating the shift fork in connection with an unsuccessful engaging operation and therewith associated jamming or catching of the sliding sleeve with the cogwheel of the second gear ratio.

11. The method of claim 10, further comprising reducing, or varying in an oscillating manner an actuating power or a rotational speed of the shift drum one or more times in connection with an unsuccessful engaging operation and therewith associated jamming or catching of the sliding sleeve with the cogwheel of the second gear ratio.

12. The method of claim 11, further comprising reducing or inverting a rotational speed of the shift drum one or more times in connection with an unsuccessful engaging operation and therewith associated jamming or catching of the sliding sleeve with the cogwheel of the second gear ratio.

13. The method of claim 12, further comprising detecting and analyzing at least the movement speed and the movement curve of the shift fork or of the shift drum actuating the shift fork in connection with a nearly successful or successful engaging operation and therewith associated fit of the sliding sleeve with the cogwheel of the second gear ratio and after a return movement of the sliding sleeve out of the fit with the cogwheel of the second gear ratio into the cogwheel of the disengaged first gear ratio.

14. The method of claim 13, further comprising detecting and analyzing at least the movement speed and the movement curve of the shift fork or of the shift drum actuating the shift fork in connection with an unsuccessful engaging operation and therewith associated jamming or catching of the sliding sleeve with the cogwheel of the second gear ratio and after a return movement of the sliding sleeve out of the fit with the cogwheel of the second gear ratio without establishing an engagement with the cogwheel of the disengaged first gear ratio.

15. The method of claim 12, further comprising detecting and analyzing at least the movement speed and the movement curve of the shift fork or of the shift drum actuating the shift fork in connection with an unsuccessful engaging operation and therewith associated jamming or catching of the sliding sleeve with the cogwheel of the second gear ratio and after a return movement of the sliding sleeve out of the fit with the cogwheel of the second gear ratio into the cogwheel of the disengaged first gear ratio.

16. The method of claim 15, further comprising detecting and analyzing at least the movement speed and the movement curve of the shift fork or of the shift drum actuating the shift fork in connection with a nearly successful or a successful engaging operation and therewith associated fit of the sliding sleeve with the cogwheel of the second gear ratio and after a return movement of the sliding sleeve out of the fit with the cogwheel of the second gear ratio without establishing an engagement with the cogwheel of the disengaged first gear ratio.

17. A torque-converting or speed-converting variable-speed transmission, comprising:
   an input shaft and an output shaft and at least two gear ratios, each of which is assigned at least one changeable gear pair, and
   shifting elements connected to the gear pairs, including cogwheels, and the shifting elements can change these connections with changing processes of changing from one gear ration to another gear ratio,
   wherein the shifting elements are in engagement with a shift drum, which is bringable into defined angular positions and rotatable between these angular positions,
   wherein the shift drum is coupled with an electric-motor direct drive, which is arranged to rotate the shift drum and bring it into the particular defined angular positions in order to change gear ratios,
   wherein the electric-motor direct drive of the shift drum is assigned at least one sensor for the detection of the electric supply currents upon actuations of the shift drum in connection with change operations of gear ratios, and
   wherein the control of the change operations of gear ratios is carried out at least based on a) the detected supply currents of the electric-motor direct drive of the shift drum and b) the rotational energies of the rotating parts in engagement with the particular cogwheels involved in a change of a particular gear ratio, and
   wherein rotational energies for different gear ratios are each weighted differently or are taken from tables or characteristic maps and each is taken into consideration differently during changing gear ratios.

* * * * *